United States Patent [19]
Adkins

[11] 4,438,426
[45] Mar. 20, 1984

[54] ELECTRONIC KEY ANTI-THEFT SYSTEM
[75] Inventor: Joey B. Adkins, Willowick, Ohio
[73] Assignee: Darrell E. Issa, Cleveland, Ohio
[21] Appl. No.: 313,820
[22] Filed: Oct. 22, 1981
[51] Int. Cl.³ .............................................. B60R 25/04
[52] U.S. Cl. ..................................... 340/64; 180/287;
307/10 AT; 340/543; 340/825.32
[58] Field of Search .............. 340/63, 64, 543, 825.31,
340/825.32, 825.63; 180/287; 307/10 AT

[56] References Cited
U.S. PATENT DOCUMENTS

| 3,585,584 | 6/1971 | Behrend | 340/64 |
| 3,812,403 | 5/1974 | Gartner | 307/10 AT |
| 3,930,226 | 12/1975 | Plumberg | 340/64 |
| 4,300,236 | 11/1981 | Gilmour | 340/825.63 |
| 4,327,353 | 4/1982 | Beard et al. | 307/10 AT |
| 4,366,466 | 12/1982 | Lutz | 307/10 AT |

Primary Examiner—David L. Trafton
Attorney, Agent, or Firm—Fay & Sharpe

[57] ABSTRACT

An electronic key (A) includes an electrical plug (10) which is connected with the power, and ground, and output terminals of an encoder (20). An electrical jack (30) is adapted to receive the electronic key plug (10) to supply ground and power thereto and receive an encoded signal therefrom. A decoder (50) is connected with the jack to receive the encoded signal and produce an enable signal if the encoded signal has a preselected code. The enable signal is extended by a first latch (54) to an indefinite duration and the extended enable signal closes an enabling switch (56) and disables an alarm control (80). The enabling switch (56) allows an automotive ignition key (60) to operate the automotive ignition (62). When the enabling switch (56) and the ignition key switch (60) are closed, the first latch is reset and a second latch (68) is enabled to continue producing the enable signal of indefinite duration. When the ignition key switch (60) is opened, a delay reset circuit (70) resets the second latch removing the enable signal after a preselected delay. Thereafter, an electronic key which produces the preselected encoded signal must be inserted into the jack to re-enable the ignition and disable the alarm control.

14 Claims, 1 Drawing Figure

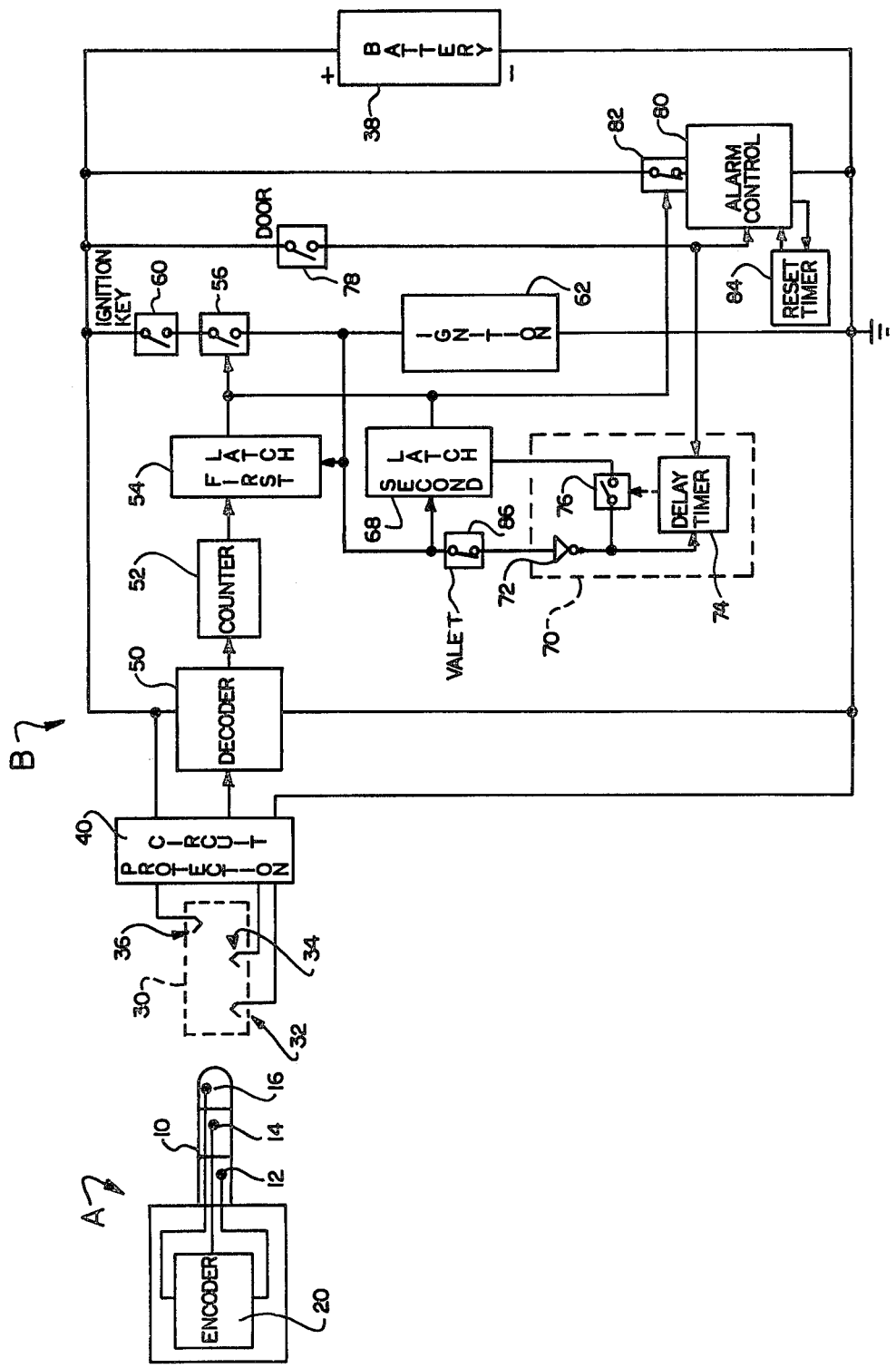

ELECTRONIC KEY ANTI-THEFT SYSTEM

BACKGROUND OF THE INVENTION

This application pertains to the art of electronic anti-theft devices. The invention finds particular application in vehicular and automotive anti-theft systems and will be described with particular reference thereto. However, the invention also finds application in other arts where it is desirable to limit access to a structure or area, such as residential or hotel door keys, pass keys for higher security rooms or tools, or the like.

Heretofore, automotive anti-theft systems have commonly included a passenger compartment located digital keyboard or electronic key for enabling the vehicle's ignition to be operated, note for example U.S. Pat. No. 4,192,400, issued Mar. 11, 1980 to J. A. McEwan. However, ignition enabling devices located inside the car do not protect the contents of the car or the vehicle itself from unauthorized entry or vandalism.

To protect the vehicle and its contents from unauthorized entry, automotive anti-theft device systems have been developed in which a key is mounted in the fender of the vehicle for actuating and deactuating an alarm or an ignition control device. The alarm is commonly connected to the vehicle's doors such that opening the door while the alarm device is enabled actuates the alarm. However, the mechanical key switches mounted in the vehicle's fender are often easier to pick than the vehicle's original equipment door locks. Further the mechanical lock switches are readily pulled from the fender and hot wired to disable the alarm. Another problem with the fender mounted mechanial key switch is that the operator must enable the alarm with the key. Frequently, the operator forgets or does not both to enable the alarm system. Accordingly, many insurance companies will accord no discount in auto rates unless the alarm system is self-arming, commonly known as, a "passive" anti-theft system.

In other prior art automotive anti-theft systems, the alarm system is actuated automatically when the ignition is turned off or the vehicle is exitted. This type of system is commonly known as a "passive" alarm system. Commonly, turning off the ignition or exiting the vehicle starts a delay timer operating which enables the alarm system after a predetermined delay. When the authorized operator returns to the vehicle and opens the door, the delay timer again provides the predetermined delay before the alarm is set off. This delay accords the authorized operator time to enter a preselected code into a digital keyboard or the like. One problem with this type of alarm is that it provides only limited protection for the contents of the vehicle. The re-entry delay before the alarm is set off, generally about thirty seconds, also accords a thief sufficient time to remove packages or electronic equipment and leave the area before the alarm sounds.

The present invention contemplates a new and improved anti-theft system which overcomes the above-referenced problems and others.

SUMMARY OF THE INVENTION

In accordance with one aspect of the present invention, there is provided a passive-instant vehicular anti-theft system. An alarm control means selectively actuates or sets off an alarm device such as a siren, lights, or the like. An entry detecting means is connected with the alarm control means for actuating it substantially immediately upon detecting an entry into the vehicle. A decoder means decodes encoded signals and produces an enable signal in response to decoding an encoded signal which has been encoded with a preselected code. An ignition enabling means is connected with the decoder for selectively enabling an automotive ignition to be operated in response to receipt of the decoder enable signal. An alarm disabling means is also connected with the decoder means to be disable the alarm in response to receiving the decoder enable signal. An automatic reset means is connected with the ignition enabling means for automatically disabling the ignition within a predetermined duration of ceasing operation of the ignition and is operatively connected with the alarm disabling means for automatically enabling the alarm within the preselected duration. An electrical jack which is operatively connected with the decoder means is mounted to receive an electrical plug from the exterior of the vehicle. An electronic key includes an encoder which produces a signal encoded with the preselected code and a plug which is adapted to be received in the jack.

In accordance with another aspect of the invention there is provided an anti-theft syste which includes at least one electronic key. Each electronic key has an encoder means for repeatedly producing an encoded signal which is encoded with a preselected code and a plug means having a plurality of contacts. The contacts are operatively connected with the power and ground inputs and the output of the encoder means. A jack receives the plug means and has a plurality of contacts for making electrical connection with the plug contacts. The jack contacts are operatively connected with a power supply, ground, and a decoder means. The decoder means receives the encoded signals and determines whether they are encoded with the preselected code. A counter means counts the number of encoded signals with the preselected code and produces an enable signal upon counting to a predetermined count. A first latch means is operatively connected with the counter for receiving the enable signal and extending it for an indefinite duration. An enable switch for selectively enabling and disabling an electrical signal to pass is operatively connected with the first latch means to be controlled by the enable signal therefrom.

An advantage of the present invention is that it provides an anti-theft system which is both passive and instant. An alarm portion is both self-arming and is actuated immediately upon an entry into the vehicle.

Another advantage of the present invention is that it is not amenable to hot-wiring, picking, or the like. Even if the exterior jack is pulled from the fender and its leads exposed, the leads may be connected in any pattern and stray signals may be applied to them without disabling the alarm.

Still further advantages will become apparent upon reading and understanding the following detailed description of the preferred embodiment.

BRIEF DESCRIPTION OF THE DRAWINGS

The invention may take form in various parts and arrangement of parts. The FIGURE is only for purposes of illustrating a preferred embodiment of the invention and is not to be construed as limiting the invention.

The FIGURE is a schematic diagram of an anti-theft system in accordance with the present invention.

DETAILED DESCRIPTION OF THE PREFERRED EMBODIMENT

The anti-theft system includes an electronic key A and a structure or vehicle mounted controller B for actuating an alarm or controlling an electrical circuit. The anti-theft system may include one or a plurality of electronic keys for each controller B or may include a plurality of controllers for each electronic key.

The electronic key includes an electrical plug means 10 which has a plurality of electrical contacts. In the preferred embodiment, the plug means has a first or ground contact 12 which is adapted to be connected with ground, a second or output contact 14, and a third or power contact 16 which is adapted to be connected with a positive potential. An encoding means 20 is mounted within a housing that is attached to the plug means 10. The encoding means has a power receiving terminal which is operatively connected with the power contact 16, a ground terminal which is operatively connected with the ground contact 12 and an output which is operatively connected with the output contact 14. When power and ground are applied to the encoder power and ground terminals, the encoder repeatedly produces on its output an encoded signal which is encoded with a preselected code. The encoding means produces a pulse width modulated encoded signal which, in the preferred embodiment, includes a synchronization pulse and twelve pulse width modulated pulses. Optionally, the encoding means 20 may produce a frequency, tone, or amplitude encoded signal or the like. As yet another option, the encoder output may be connected by a modem or interface means with the power contact 16. The modem or interface means superimposes the output signal on the DC power signal. This reduces the number of contacts of the plug means to two which helps obscure how the electronic key operates and, hence, how it might be defeated.

The controller B includes a jack means 30 which is dimensioned to receive the plug means 10. The jack means has a plurality of contacts for supplying power and ground to the electronic key and for receiving the output signal therefrom. The jack means 30 includes a first contact 32 which makes electrical contact with the key ground contact 12 for supplying ground thereto. A second jack contact 34 is disposed to engage the second key contact 14 to receive the encoded signal therefrom. A third jack contact 36 is adapted to make electrical contact with the key power contact 16 to supply electrical power thereto. The jack ground contact 32 is operatively connected with the ground terminal of a battery 38 and the jack power contact 36 is operatively connected with the positive terminal of the battery. The jack contacts are connected with a protection circuit means 40 for protecting the controller electronics from unauthorized tampering. The protection circuitry includes a voltage regulating means connected with the second and third jack contacts for preventing an unauthorized signal from a high voltage electrical probe from damaging the controller electronics. The voltage regulating means limits or clamps the voltages on these contacts within the operating range of the electronic components, e.g., twelve volts. The protection circuit means 40 also includes means for preventing an unauthorized metallic probe from damaging the battery by shorting it to the ground.

A decoding means 50 is operatively connected with the jack encoded signal contact 34 for receiving the encoded signals therefrom. The decoding means 50 is a pulse width modulated decoder for comparing received encoded signals with said preselected pulse width modulated code. Each time the decoding means receives an encoded signal which is encoded with the preselected code, it produces an enable pulse. For greater security, a counting means 52 is connected with the decoder enable output for counting the number of enable pulses produced by the decoding means. The counter means produces an enable pulse when it counts a preselected number of pulses from the decoding means, e.g., five pulses. In this manner, the chances of disabling the anti-theft system with a stray signal or random luck are decreased because the preselected signal must be received consistently a repeated number of times. A first latch means 54 is connected with the counter 52 to receive the enable signal therefrom. The first latch means extends the enable signal from the counter or decoder, which is generally for relatively short duration, to an enable signal of indefinite duration. The enable signal of indefinite duration is conveyed from an output of the first latch means to an enable switch means 56 for selectively permitting and preventing an electrical signal to pass therethrough.

The enable switch means 56 may be used to control the passage of electrical signals used for various purposes. These signals could be used for providing access to machinery, electrically released door locks, or the like. In the preferred embodiment, the enable switch 56 allows electrical power to pass through a stearing column mounted ignition key switch 60 to a vehicular ignition 62. This controls the flow of electrical power to the starter motor, spark plugs, and other electrical components of a vehicular motor.

When the enable switch 56 and the ignition switch 60 are both closed, an electrical signal is provided to an input of a second latch means 68. When enabled by the signal from the enable switch 56, the second latch means 68 produces an enable signal of indefinite duration on a second latch means output. The second latch means output is connected with the first latch means output such that both enable signals enable the enable switch 56. The electrical signal from the enable and ignition switches is also connected with a reset of the first latch means 54 for resetting it, i.e., causing it to stop producing the enable signal. In this manner, the enable switch means 56 may remain closed without additional encoded signals being decoded by the decoding means 50.

An automatic reset means 70 automatically resets the enabled switch to its open condition after a preselected delay from the removal of the ignition key. More specifically, opening of the stearing column ignition key switch 60 removes the positive electrical signal from the enable switch means 56. The automatic reset means 70 includes an inverter 72 which converts this absence of a positive electrical signal into a positive reset signal. The reset signal is connected with a delay timer means 74 to start its delay time period running. After the preselected delay, the delay timer closes a switch means 76 which applies reset signal to a reset input of the second latch means 68. In this manner, removal of the ignition key causes after the preselected delay the enable switch 56 to be disabled or returned to its open state automatically. The delay timer means 74 is connected with a door switch 78 which allows the delay timer to run when the vehicle doors are closed and disables the delay timer from running when a vehicle door is open.

In this manner, an authorized operator is allowed extra time to unload packages or the like from the vehicle. A valet switch 86 is provided to hold the anti-theft system disarmed to allow others without the electronic key to operate the vehicle.

The enable signal from the first and second latch means also disables an alarm control means 80. More specifically, the enable signal enables an alarm control disabling means 82. The alarm control means 80 is further connected with the door switch 78 in such a manner that opening the door actuates the enabled alarm control means. When actuated, the alarm control means applies the appropriate power or electrical signals to an audio alarm such as a siren or a visual alarm such as flashing lights. The alarm control means is connected with an alarm reset timer 84 for resetting the alarm a preselected time after it is actuated, e.g., three minutes. In this manner, the audio alarm is sounded or the visual alarm displayed for the preselected time after an unauthorized entrance into the vehicle. The preselected time period is selected sufficiently long that it will frighten away the thief and bring aid or assistance to the vehicle but not so long that it is likely to cause the vehicle battery to go dead. Optionally, the alarm control means 80 may be connected with other actuating switches such as a motion detecting switch or a vibration detecting switch for detecting jacking of the vehicle or breaking of a vehicle window.

The invention has been described with reference to the preferred embodiment. Obviously, modifications and alterations will occur to others upon reading and understanding the preceeding detailed description. It is intended that the invention be construed as including all such alterations and modifications insofar as they come within the scope of the appended claims or the equivalents thereof.

Having thus described the preferred embodiment of the invention, the invention is now claimed to be:

1. A passive-instant vehicular anti-theft system comprising:
   an alarm control means for selectively actuating and deactuating an alarm device;
   entry detecting means for detecting entry into the vehicle, the entry detecting means being connected with the alarm control means to actuate the alarm device substantially immediately upon entry into the vehicle, whereby the anti-theft system is instant;
   a decoder means for decoding encoded signals, the decoder producing an enable signal in response to decoding a signal encoded with a preselected code signal;
   ignition enabling means for selectively enabling an ignition to be operated, the ignition enabling means being operatively connected with the decoder means to enable the ignition in response to the enable signal;
   an alarm disabling means for selectively disabling the alarm control means, the alarm disabling means being operatively connected with the decoder means to disable the alarm in response to the enable signal;
   automatic reset means for causing the ignition enabling means to disable the ignition and the alarm disabling means to enable the alarm control within a preselected duration of ceasing operation of the ignition, whereby the anti-theft system is passive;
   an electrical jack mounted to receive an electric plug from the exterior of the vehicle, the jack being operatively connected with the decoder means such that the decoder is adapted to receive encoded signals therefrom; and
   an electronic key including an encoder means which produces a signal encoded with said preselected code and a plug which is adapted to be received in the jack such that the encoder is operatively connected with the decoder, whereby the anti-theft system is undefeatable by mechanical lock picking, hot wiring, short circuiting, or the like.

2. The anti-theft system as set forth in claim 1 further including a first latch means operatively connected with the decoder means for receiving the enable signal therefrom and for producing an enable signal of extended duration, the first latch means being operatively connected with the ignition enabling means and the alarm disabling means.

3. The anti-theft system as set forth in claim 2 further including a second latch means having an input which is operatively connected with the ignition enabling means to be enabled with the ignition and having an output which is connected with the output of the first latch means whereby the second latch means produces an enable signal of indefinite duration for enabling the ignition enabling means once the ignition has been enabled.

4. The anti-theft system as set forth in claim 3 wherein the second latch means input is connected with a reset input of the first latch means such that when the ignition is enabled, the first latch means is reset and stops producing the enable signal.

5. The anti-theft system as set forth in claim 4 further including a reset means for resetting the second latch in response to the ignition being disabled.

6. The anti-theft system as set forth in claim 5 wherein the second latch reset means includes a delay timer for delaying resetting of the second latch for a preselected delay after disabling of the ignition, whereby during the preselected delay, the ignition may be reactuated without the decoder means decoding an encoded signal which is encoded with the preselected code.

7. The anti-theft system as set forth in claim 6 wherein the delay timer is operatively connected with a door switch means for stopping the running of the delay timer while a vehicle door is open, whereby the preselected delay is extended by the duration with which a vehicle door is open.

8. The anti-theft system as set forth in claim 7 wherein the encoded signal is a pulse width modulated encoded signal.

9. An anti-theft system comprising:
   at least one electronic key including an encoder means for repeatedly producing an encoded signal which is encoded with a preselected code and a plug means having a plurality of contacts which are operatively connected with a power input of the encoder means to supply electrical power thereto, operatively connected with a ground input of the encoder means to supply ground thereto, and operatively connected with an output of the encoder means to carry the repeating encoded signal;
   a jack for receiving the plug means, the jack having a plurality of contacts which are adapted to make electrical connection with the plug means contacts, the jack contacts being operatively connected with a power supply for supplying power to the encoder means, operatively connected with ground to supply ground to the encoder means, and operatively connected with a decoder means for receiving encoded signals from the encoder, the decoder means determining whether received signals are encoded with said preselected code, a counter means for counting the number of encoded signals encoded with the preselected code which are received by the decoder means and for producing an enable signal upon counting to a predetermined count, a first latch means operatively connected with the counter for receiving the enable signal and extending it for an indefinite duration, and an enabling switch means for selectively enabling and disabling an electrical signal to pass, the enabling switch means being operatively connected with the first latch means to the controlled by the enable signal therefrom.

10. The anti-theft system set forth in claim 9 wherein the encoded signal is a pulse width modulated encoded signal.

11. The anti-theft system as set forth in claim 9 further including a second latch means having an input operatively connected with the enabling switch means to be activated by an electrical signal passing therethrough and having an output on which an enable signal of indefinite duration is produced, the second latch means output being operatively connected with the enabling switch means for enabling it, whereby once an electrical signal passes through the enabling switch means, the second latch means holds the enabling switch means enabled.

12. The anti-theft system as set forth in claim 11 further including a delay reset means for resetting the second latch means, the delay reset means being operatively connected with the enabling switch means for resetting the second latch means within a preselected delay after the electrical signal stops passing.

13. The anti-theft system as set forth in claim 12 further including an alarm control means for selectively actuating and deactuating an alarm device and an alarm disabling means for selectively disabling the alarm control means from actuating the alarm device, the disabling means being operatively connected with the first and second latch means outputs such that the enable signal disables the alarm control means.

14. The anti-theft system as set forth in claim 13 further including protection circuitry operatively connected with the jack means for protecting the decoder means, the first and second latch means, and the alarm control means from unauthorized electrical signals.

* * * * *